F. H. MOONEY & F. S. CRANE.
SEPARABLE BUTTON.
APPLICATION FILED AUG. 16, 1909.
964,928.
Patented July 19, 1910.
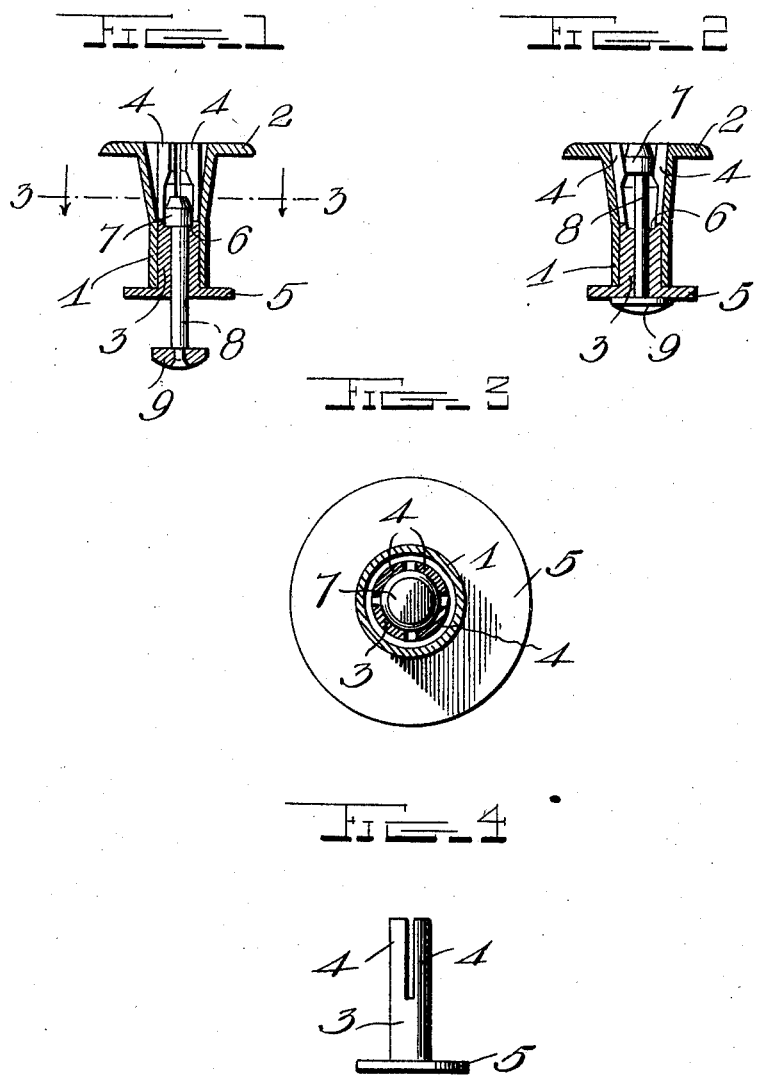

UNITED STATES PATENT OFFICE.

FRANK H. MOONEY AND FRANK S. CRANE, OF CHICAGO, ILLINOIS.

SEPARABLE BUTTON.

964,928.     Specification of Letters Patent.     Patented July 19, 1910.

Application filed August 16, 1909. Serial No. 513,104.

*To all whom it may concern:*

Be it known that we, FRANK H. MOONEY and FRANK S. CRANE, citizens of the United States, residing at Chicago, in the county of Cook and State of Illinois, have invented certain new and useful Improvements in Separable Buttons; and we do declare the following to be a full, clear, and exact description of the invention, such as will enable others skilled in the art to which it appertains to make and use the same.

This invention relates to an improvement in separable fasteners especially adapted for application to studs, dress fasteners, glove fasteners and the like.

The object of the invention is to provide a simply constructed device of this character the parts of which are so connected that it is impossible to detach one from the other accidentally and when once locked together they form a reliable fastening device.

With this and other objects in view, the invention consists of certain novel features of construction, combination and arrangement of parts as will be more fully described and particularly pointed out in the appended claim.

In the accompanying drawings: Figure 1 represents a vertical section of this improved fastening device with the parts in inoperative position; Fig. 2 is a similar view with the parts in operative position; Fig. 3 is a transverse section taken on the line 3—3 of Fig. 1, and, Fig. 4 is a side elevation of the sleeve detached.

In the embodiment illustrated what may be termed the bottom or stationary member of the device comprises a hollow stem 1 the lower portion of which is flared outwardly and is provided at its lower end with a laterally extending base flange 2, which forms a retainer for this portion of the fastener when inserted in a button hole or similar aperture.

The top or removable portion of the fastener comprises a sleeve 3 having one end thereof slit longitudinally to provide a plurality of spring fingers as 4 the inner wall of the slit portion of the sleeve being preferably provided with a beveled annular shoulder 10 near its outer end for a purpose to be described. This sleeve is preferably made of resilient metal and is provided at its other end with a laterally extending flange 5, and is provided on its inner face near its flanged end with an annular shoulder 6 designed to form a stop for the head 7 of the central rod or pin 8 now to be described. This pin 8 is rotatably and slidably mounted within the sleeve 3 and is provided at its outer end with a knob or head 9 which may be made of any suitable or desired material and decorated as desired according to the purpose for which it is designed. The other end of this pin 8 is provided with a head 7 which is preferably beveled at its outer or free end to facilitate its insertion between the fingers formed by the slits 4 in the end of the sleeve 3. This head 7 is larger than the inner bore of the slit end of the stem 3 and is designed when forced thereinto to cause the spring fingers 4 to spread outwardly to lock the removable member within the hollow stem 1 as is shown clearly in Fig. 1. It will thus be obvious that this central rod or pin 8 forms the locking means when the two parts of the stud or fastener have been fitted together.

In the use of this invention as applied to a stud the bottom or outer portion 1 is inserted in the button hole and the headed central rod or pin is moved outwardly to disengage the head 7 from the split end of the sleeve 3. This sleeve is then inserted within the hollow stem 1 and the rod 8 is forced inwardly into said sleeve to cause the head 7 thereof to project through the split end of the sleeve 3 whereby the fingers formed by the slits in said sleeve firmly grip said head 7 and are forced outwardly whereby the slit end is locked against withdrawal from the stem 1 during the engagement of said rod. When it is desired to remove the fastener the head 9 of the rod is pulled outwardly to disengage the head 7 from the fingers of the sleeve 1 permitting said fingers to be compressed and move freely outward through the stem 1.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

We claim as our invention:

A separable fastener comprising a hollow stem having the bore thereof enlarged at one end and provided with retaining means, a sleeve, the outer diameter of which corresponds with the inner diameter of the small end of said stem, said sleeve being provided at one end with a plurality of longitudinally extending spring fingers, each having an inwardly inclined shoulder arranged on its inner face, a stop arranged on the inner face of said sleeve near its other end and a locking rod operable within said sleeve and provided with a head of a diameter greater than the inner diameter of the spring fingers and having its outer end reduced to facilitate its insertion.

In testimony whereof we have hereunto set our hands in presence of two subscribing witnesses.

FRANK H. MOONEY.
FRANK S. CRANE.

Witnesses:
JOHN PLUNKETT,
R. H. SMITH.